US010704682B2

(12) United States Patent
Chen

(10) Patent No.: US 10,704,682 B2
(45) Date of Patent: Jul. 7, 2020

(54) TRANSMISSION CONTROL SYSTEM

(71) Applicant: INDUSTRIAL TECHNOLOGY RESEARCH INSTITUTE, Hsinchu (TW)

(72) Inventor: Yi Shin Chen, Chiayi (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 73 days.

(21) Appl. No.: 16/149,454

(22) Filed: Oct. 2, 2018

(65) Prior Publication Data
US 2020/0072347 A1  Mar. 5, 2020

(30) Foreign Application Priority Data

Aug. 28, 2018 (TW) .............................. 107129892 A

(51) Int. Cl.
*F16H 61/02* (2006.01)
*F16H 61/16* (2006.01)
(Continued)

(52) U.S. Cl.
CPC ......... *F16H 61/16* (2013.01); *F16H 61/0213* (2013.01); *F16H 61/32* (2013.01);
(Continued)

(58) Field of Classification Search
CPC ................ F16H 61/0213; F16H 61/16; F16H 2061/163; F16H 2061/168; F16H 2061/0234; F16H 59/50; F16H 59/58
See application file for complete search history.

(56) References Cited

U.S. PATENT DOCUMENTS 8,935,966 B2   1/2015 Arai
9,026,322 B2   5/2015 Kojima et al.
(Continued)

FOREIGN PATENT DOCUMENTS

CN   101398043 B   4/2009
CN   101398046 B   4/2009
(Continued)

OTHER PUBLICATIONS

Hongtao Hao et al., A new control strategy of the filling phase for wet dual clutch transmission, Archive Proceedings of the Institution of Mechanical Engineers Part C Journal of Mechanical Engineering Science, 2016, 230(12).
(Continued)

*Primary Examiner* — Edwin A Young
(74) *Attorney, Agent, or Firm* — Locke Lord LLP; Tim Tingkang Xia, Esq.

(57) ABSTRACT

A transmission control system, which is adapted to be installed in a vehicle body of a two-wheeler, includes a transmission assembly, a mobile device and a transmission controller. The transmission assembly is configured to be disposed on the vehicle body and to perform a gear-shifting operation. The mobile device is configured to be detachably disposed on the vehicle body. The mobile device includes an orientation sensor capable of detecting a current center-of-gravity of the vehicle body to generate a current center-of-gravity datum. The transmission controller is configured to be disposed on vehicle body, to receive the current center-of-gravity datum, to calculate a roll angle variation according to the current center-of-gravity datum, and to output a gear-shift control command according to the roll angle variation. The transmission controller is configured to indicate the transmission assembly whether to perform the
(Continued)

US 10,704,682 B2

Page 2 gear-shifting operation according to the gear-shift control command.

13 Claims, 5 Drawing Sheets

(51) Int. Cl.
  *F16H 61/32* (2006.01)
  *F16H 61/28* (2006.01)
  *F16H 59/24* (2006.01)
  *F16H 59/54* (2006.01)
  *F16H 59/44* (2006.01)
  *F16H 59/50* (2006.01)
  *F16H 59/70* (2006.01)

(52) U.S. Cl.
  CPC .............. *F16H 59/24* (2013.01); *F16H 59/44* (2013.01); *F16H 59/50* (2013.01); *F16H 59/54* (2013.01); *F16H 59/70* (2013.01); *F16H 2061/0234* (2013.01); *F16H 2061/163* (2013.01); *F16H 2061/168* (2013.01); *F16H 2061/2869* (2013.01)

(56) References Cited

U.S. PATENT DOCUMENTS

| 9,032,824 | B2 | 5/2015 | Arai |
| 9,126,600 | B2 | 9/2015 | Iizuka |
| 2007/0074922 | A1 | 4/2007 | Coombs et al. |
| 2007/0199782 | A1 | 8/2007 | Mizuno et al. |
| 2009/0165582 | A1 | 7/2009 | Tsunashima et al. |
| 2012/0083973 | A1* | 4/2012 | Araki ............... B62K 21/00 701/43 |
| 2016/0176405 | A1 | 6/2016 | Saitoh |
| 2016/0375948 | A1* | 12/2016 | Takenaka ............... B62K 5/01 280/5.506 |
| 2016/0375958 | A1* | 12/2016 | Hashimoto ............ B62M 9/122 701/58 |
| 2017/0030419 | A1 | 2/2017 | Mitsubori et al. |

FOREIGN PATENT DOCUMENTS

| CN | 100577455 C | 1/2010 |
| CN | 101687500 B | 12/2013 |
| CN | 102141143 B | 3/2014 |
| CN | 104747709 A | 7/2015 |
| JP | 2009079701 A | 4/2009 |
| JP | 2009287606 A | 12/2009 |
| JP | 2010078117 A | 4/2010 |
| JP | 2011169394 A | 9/2011 |
| TW | M489826 U | 11/2014 |

OTHER PUBLICATIONS

Junya Watanabe et al., Development of Dual Clutch Transmission for Large Motorcycles, SAE International Journal of Engines, 2010, vol. 4, Issue1.
Chunming Li et al., Modeling and Simulation of Dual-Clutch Transmission Based on Physical Modeling Environment, Journal of Residuals Science & Technology, 2016, vol. 13, No. 7.
Hongbo Liu et al., Shift Quality Optimization Based on Assessment System for Dual Clutch Transmission, SAE International, 2012.
Tao Deng et al., Study on Torque Control Strategy of Dual Clutch Transmission during Shifting, Applied Mechanics and Materials, 2012, vol. 121-126, pp. 3541-3545.
Taiwan Patent Office, "Office Action", dated Aug. 5, 2019, Taiwan.

\* cited by examiner

TRANSMISSION CONTROL SYSTEM

CROSS-REFERENCE TO RELATED APPLICATIONS

This non-provisional application claims priority under 35 U.S.C. § 119(a) on Patent Application No(s). 107129892 filed in Taiwan, R.O.C. on Aug. 28, 2018, the entire contents of which are hereby incorporated by reference.

TECHNICAL FIELD

The disclosure relates to a transmission control system.

BACKGROUND

Vehicles, such as cars and motorcycles, have a power transmission system which is able to provide controlled application of the power according to the driving condition. Generally, the term transmission refers to the whole drivetrain, including clutch actuator, gearbox and other essential components. The clutch actuator acts as a link between the gearbox and the pedal, allowing the rider or driver to engage the gears during riding or driving.

An automatic transmission is a type of vehicle transmission that can automatically change gear ratios as speed and throttle position varies. It is convenient to operate the vehicles but also might be dangerous in some circumstances. For example, while the vehicle is taking a sharp turn on the road, an unexpected gear shifting may easily cause the vehicle to slip or roll over.

SUMMARY

One embodiment of the disclosure provides a transmission control system which is adapted to be installed in a vehicle body of a two-wheeler. The transmission control system includes a transmission assembly, a mobile device and a transmission controller. The transmission assembly is configured to be disposed on the vehicle body and to perform a gear-shifting operation. The mobile device is configured to be detachably disposed on the vehicle body. The mobile device includes an orientation sensor capable of detecting a current center-of-gravity of the vehicle body to generate a current center-of-gravity datum. The transmission controller is configured to be disposed on vehicle body, to receive the current center-of gravity datum, to calculate a roll angle variation according to the current center-of-gravity datum, and to output a gear-shift control command according to the roll angle variation. The transmission controller is configured to indicate the transmission assembly whether to perform the gear-shifting operation according to the gear-shift control command.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
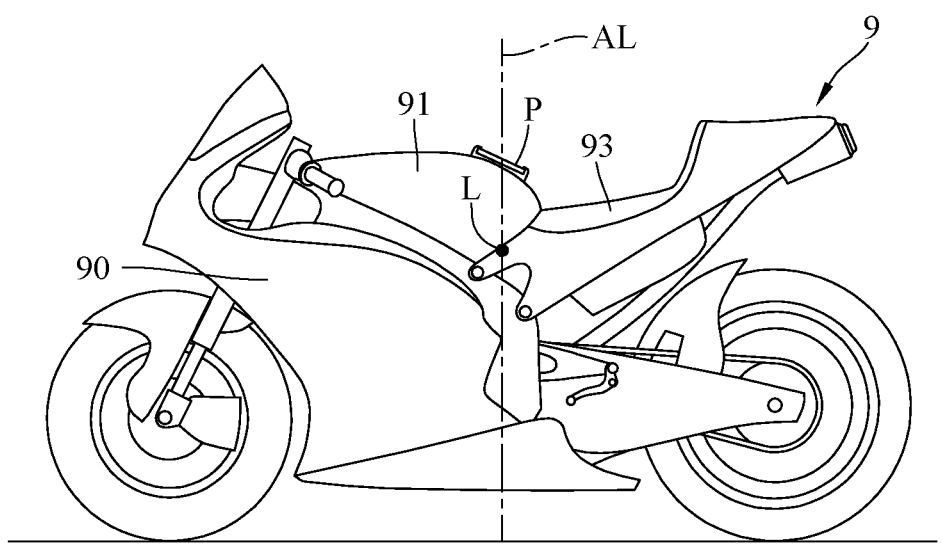
FIG. 1 is a side view of a two-wheeler installed with a mobile device of a transmission control system in accordance with one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The drawings may not be drawn to actual size or scale, some exaggerations may be necessary in order to emphasize basic structural relationships, while some are simplified for clarity of understanding, and the present disclosure is not limited thereto. It is allowed to have various adjustments under the spirit of the present disclosure. In the specification, the term "on" may be described as "one is located above another" or "one is in contact with another". In addition, the terms "top side", "bottom side", "above" and "below" are used to illustrate but limit the present disclosure. The term "substantially" is referred to the complete or nearly complete extent or degree of a structure, which means that it is allowable to have tolerance during manufacturing.

Figure 2:
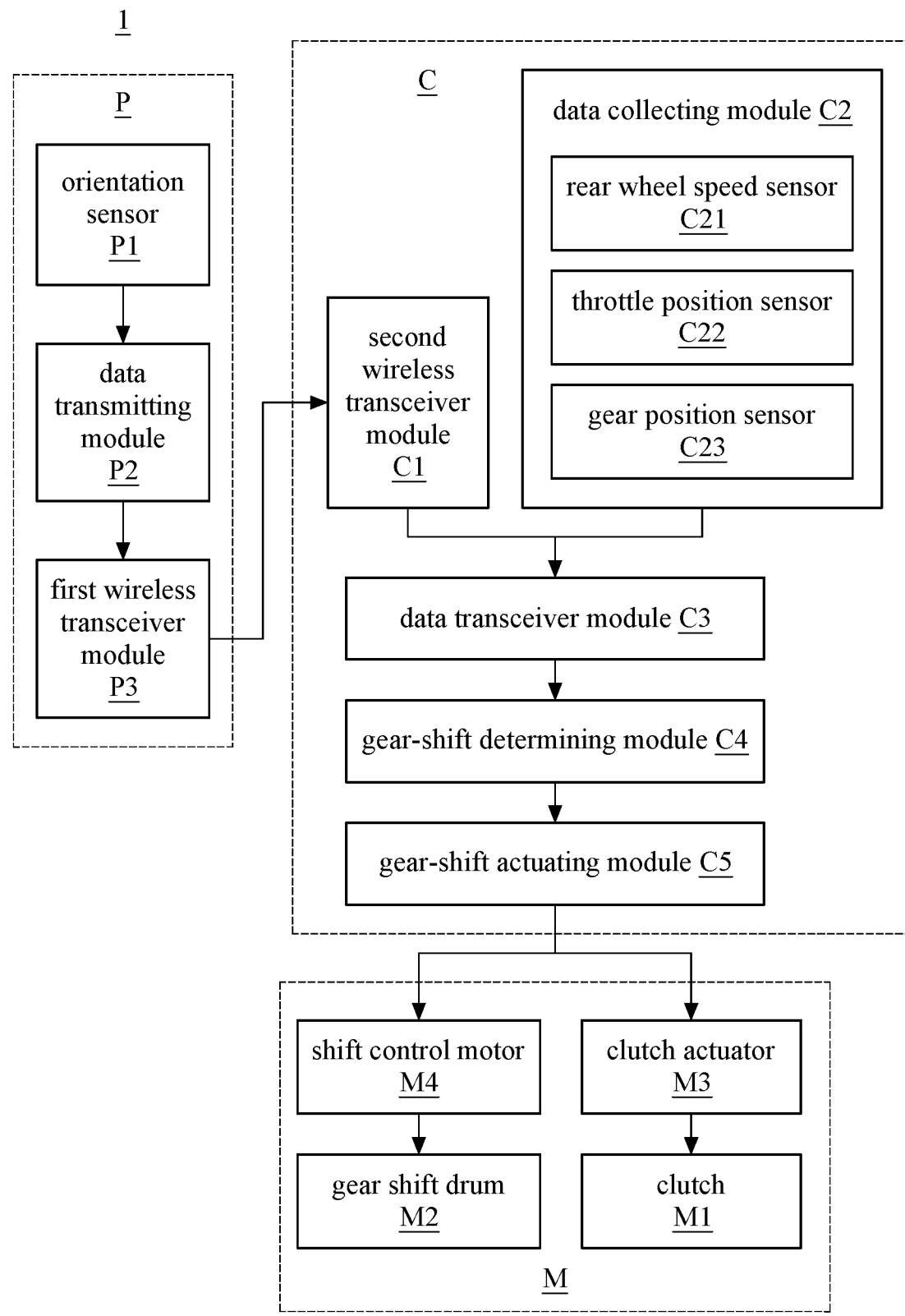
FIG. 2 is a block diagram illustrating the transmission control system.
Figure 3:
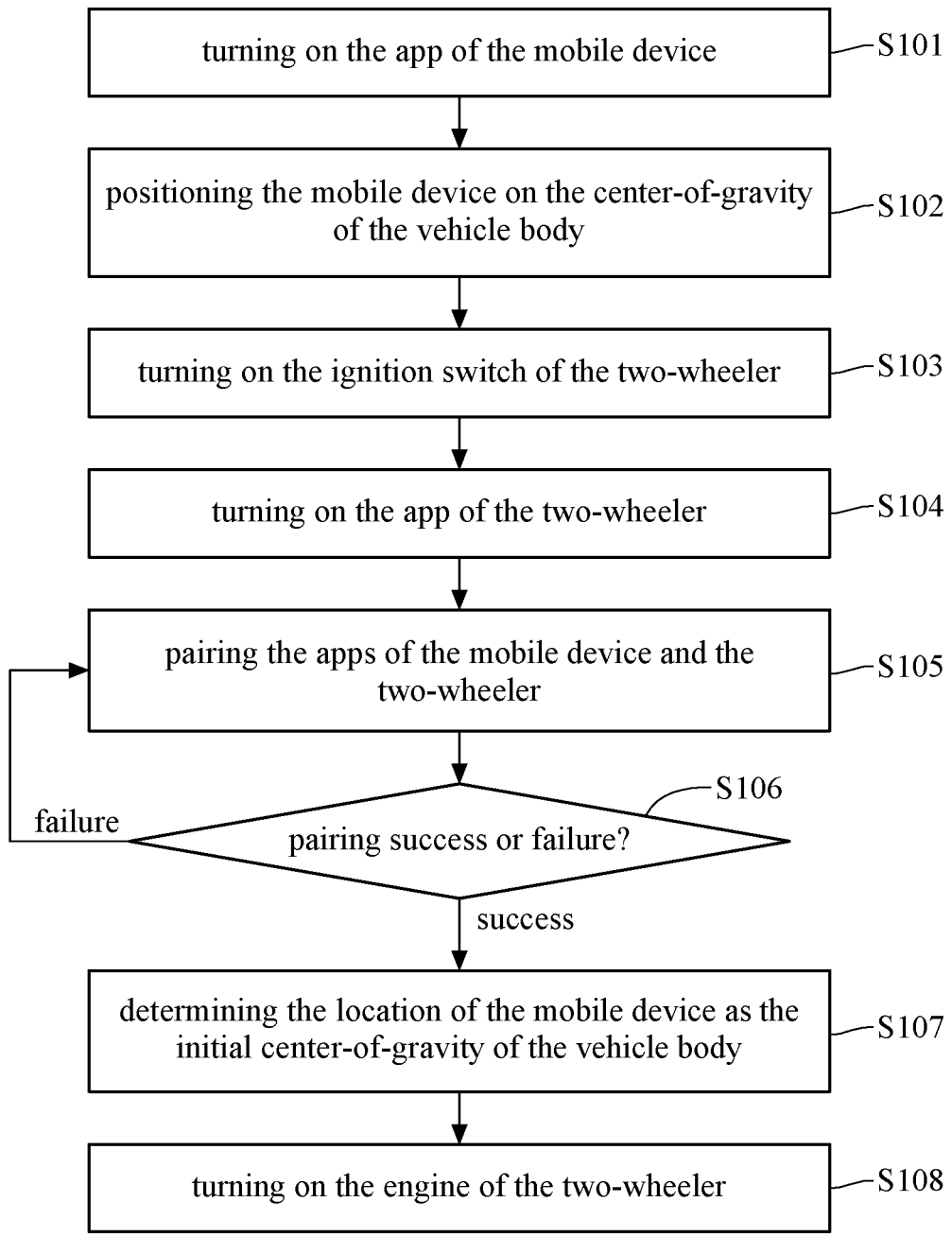
FIG. 3 is a flowchart illustrating steps of disposing the mobile device on the vehicle body and communicating with the two-wheeler.

Please refer to FIG. 1 to FIG. 3. FIG. 1 is a side view of a two-wheeler installed with a mobile device of a transmission control system in accordance with one embodiment of the disclosure, FIG. 2 is a block diagram illustrating the transmission control system, and FIG. 3 is a flowchart illustrating steps of disposing the mobile device on the vehicle body and communicating with the two-wheeler.

In this embodiment, a transmission control system 1 is provided. The transmission control system 1 is adapted to be installed in a vehicle body 90 of a two-wheeler 9. The transmission control system 1 includes a transmission assembly M, a mobile device P and a transmission controller C.

The transmission assembly M is configured to be disposed on the vehicle body 90 and to perform a gear-shifting operation. The transmission assembly M includes a clutch M1, a gear shift drum M2, a clutch actuator M3 and a shift control motor M4. The clutch actuator M3 is configured to control the clutch M1, and the shift control motor M4 is configured to control the gear shift drum M2. When the transmission assembly M performs the gear-shifting operation, the clutch actuator M3 is driven to control the clutch M1 to engage to or disengage from a power source (not shown in figures) and a power transmission system (not shown in figures) of the two-wheeler 9, and the shift control motor M4 is driven to control the gear shift drum M2 to shift gears.

The mobile device P is, for example, a smartphone, and is able to be detachably disposed on a center-of-gravity L of the vehicle body 90. The mobile device P includes an orientation sensor P1, a data transmitting module P2 and a first wireless transceiver module P3.

The orientation sensor P1 is configured to detect a current center-of-gravity that involves the vehicle body 90 or both the vehicle body 90 and any load on the vehicle body 90 to generate a current center-of-gravity datum. For example, during riding, the orientation sensor P1 is able to detect the current center-of-gravity that considers both the weight of a rider (not shown in FIG. 1) and the two-wheeler 9 to generate the current center-of-gravity datum.

The mobile device P is able to be detachably disposed on the center-of-gravity L of the vehicle body 90, which helps the orientation sensor P1 to accurately detect the current center-of-gravity to generate an accurate current center-of-gravity datum. The mobile device P is also allowed to be detachably disposed on other places that are near the center-of-gravity L or near an axis AL passing through the center-of-gravity L and perpendicular to the ground. As an exemplary example, in this embodiment, the two-wheeler 9 is a sport bike, and the center-of-gravity of the vehicle body 90 and rider would be approximately located around a junction of a gas tank 91 and a saddle 93 of the vehicle body 90 and the mobile device P is disposed on a place of the gas tank 91 that is near the axis AL. In such a case, the location of the mobile device P is beneficial to accurately detect the current center-of-gravity and is convenient to be attached onto or detached from the vehicle body 90.

The data transmitting module P2 is configured to receive the current center-of-gravity datum generated by the orientation sensor P1 and transmit it to the first wireless transceiver module P3. Conventionally, a smartphone contains an orientation sensor which is able to detect an inertial force applied on the smartphone along a specific direction to obtain the acceleration of the smartphone and gravity on the smartphone in said specific direction so as to detect the orientation variation of the smartphone and report the smartphone's pitch angle, roll angle and yaw angle with respect to the X axis, Y axis and Z axis, respectively. In this embodiment, the current center-of-gravity of the two-wheeler 9 can be detected by the aforementioned orientation sensor installed in the smartphone, and thus the two-wheeler 9 has no need to be additionally equipped with an orientation sensor, thereby saving the cost of installing an orientation sensor on the two-wheeler 9.

In this embodiment, the mobile device P and the two-wheeler 9 are able to be in communication with each other via respective apps installed therein. The location of the mobile device P is determined as an initial center-of-gravity of the vehicle body 90 as the mobile device P and the two-wheeler 9 communicate. The detailed descriptions are shown in FIG. 3. Firstly, in steps S101 to S102, an app of the mobile device P is turned on, and then the mobile device P is positioned on the center-of-gravity of the vehicle body 90. Then, in steps S103 to S104, an ignition switch of the two-wheeler 9 is turned on, and then an app of the two-wheeler 9 is turned on. Then, in step S105, after the apps of both the mobile device P and the two-wheeler 9 have been turned on, they begin to pair with each other. Then, step S106 is to determine whether step S105 is success or failure. When step S105 is determined to be successful, step S107 is performed to determine the location of the mobile device P as an initial center-of-gravity of the vehicle body 90. Lastly, in step S108, an engine of the two-wheeler 9 is turned on. By performing the above steps, the preparation for riding the two-wheeler 9 is finished.

It is noted that step S107 is performed while the two-wheeler 9 is in a stationary state, and the positioning of the mobile device P is completed by zeroing the coordinates of the orientation sensor P1.

In addition, the order of performing steps S101, S102 and S103 is not restricted. In some other embodiments, steps S101, S102 and S103 may be performed in a different order.

The transmission controller C is, for example, a CPU chip that is disposed in the vehicle body 90, and the transmission controller C includes a second wireless transceiver module C1, a data collecting module C2, a data transceiver module C3, a gear-shift determining module C4 and a gear-shift actuating module C5.

In this embodiment, both the second wireless transceiver module C1 of the transmission controller C and the first wireless transceiver module P3 of the mobile device P are BLUETOOTH communication modules. The transmission controller C is configured to receive the current center-of-gravity datum from the first wireless transceiver module P3 via the second wireless transceiver module C1. The current center-of-gravity datum is able to be transmitted via a wireless manner, thus there is no troublesome installing and tangling of wire. As a result, attaching the mobile device P on the vehicle body 90 and detaching it from the vehicle body 90 are both convenient for the rider.

The data collecting module C2 is configured to generate mechanical data according to both the two-wheeler 9 and the transmission assembly M. Specifically, the data collecting module C2 includes a rear wheel speed sensor C21, a throttle position sensor C22 and a gear position sensor C23. The rear wheel speed sensor C21 is configured to detect a speed of the two-wheeler 9 to generate a speed datum, the throttle position sensor C22 is configured to detect a throttle opening of the engine of the two-wheeler 9 to generate a throttle opening datum, and the gear position sensor C23 is configured to detect a current gear position of the transmission assembly M to generate a current gear position datum.

The data transceiver module C3 is configured to transfer the current center-of-gravity datum transmitted from the second wireless transceiver module C1 as well as the speed datum, throttle opening datum and current gear position datum collected by the data collecting module C to the gear-shift determining module C4.

The gear-shift determining module C4 is configured to determine whether to perform a gear-shift determining process S2 by determining whether the speed datum reaches a speed threshold and throttle opening datum reaches a throttle opening threshold in accordance with the current gear position datum. For example, when the gear-shift determining module C4 determines that the speed of the two-wheeler 9 reaches the speed threshold and the throttle opening of the engine of the two-wheeler 9 reaches the throttle opening threshold in accordance with the current gear position datum of the transmission assembly M, the gear-shift determining module C4 performs the gear-shift determining process S2.

The gear-shift actuating module C5 is configured to indicate the transmission assembly M whether to perform the gear-shifting operation according to a gear-shift control command outputted by the gear-shift determining module C4 after the gear-shift determining process S2. The gear-shift control command includes a shift inhibition signal, a gear holding signal and a shifting signal. These signals and their function to the transmission assembly M are described in more detail later on. It is noted that, in this embodiment, said gear-shifting operation does not include shifting from to the neutral gear.

Specifically, when the gear-shift determining module C4 performs the gear-shift determining process S2, the gear-shift determining module C4 is able to send a gear shift request, receive the current center-of-gravity datum, calculate a roll angle variation R according to the current centerof-gravity datum, and determine whether the roll angle variation R is larger than or equal to an upper limit R1. Furthermore, the gear-shift determining module C4 is able to output the shift inhibition signal when the roll angle variation R is determined to be larger than or equal to the upper limit R1, determine whether the roll angle variation R is larger than or equal to a lower limit R2 when the roll angle variation R is determined to be smaller than the upper limit R1, output the gear holding signal when the roll angle variation R is determined be to larger than or equal to the lower limit R2, and output the shifting signal when the roll angle variation R is determined to be smaller than the lower limit R2.

Figure 4:
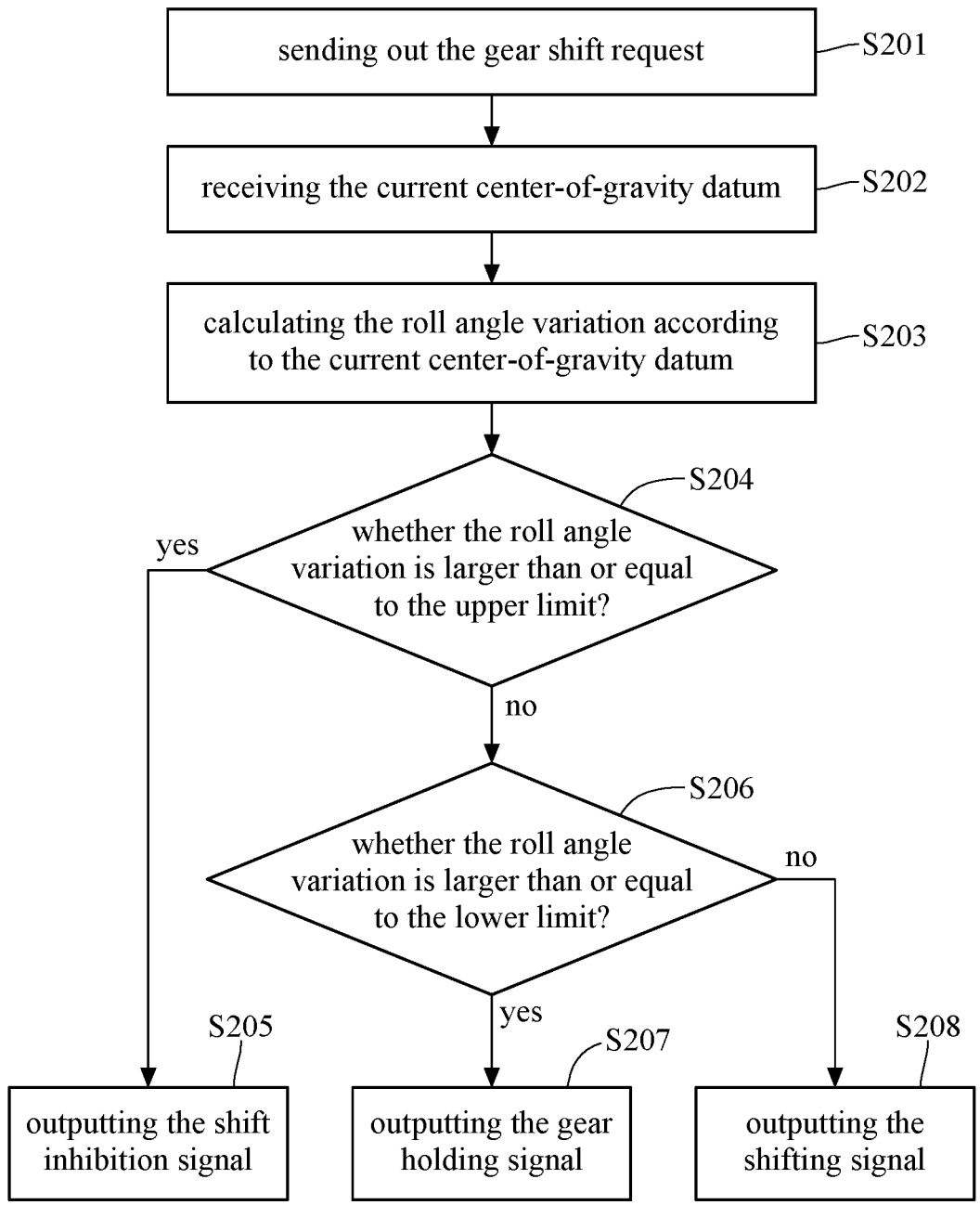
FIG. 4 is a flowchart illustrating steps for a gear-shift determining module in FIG. 2 to determine the gear shifting.
Figure 5:
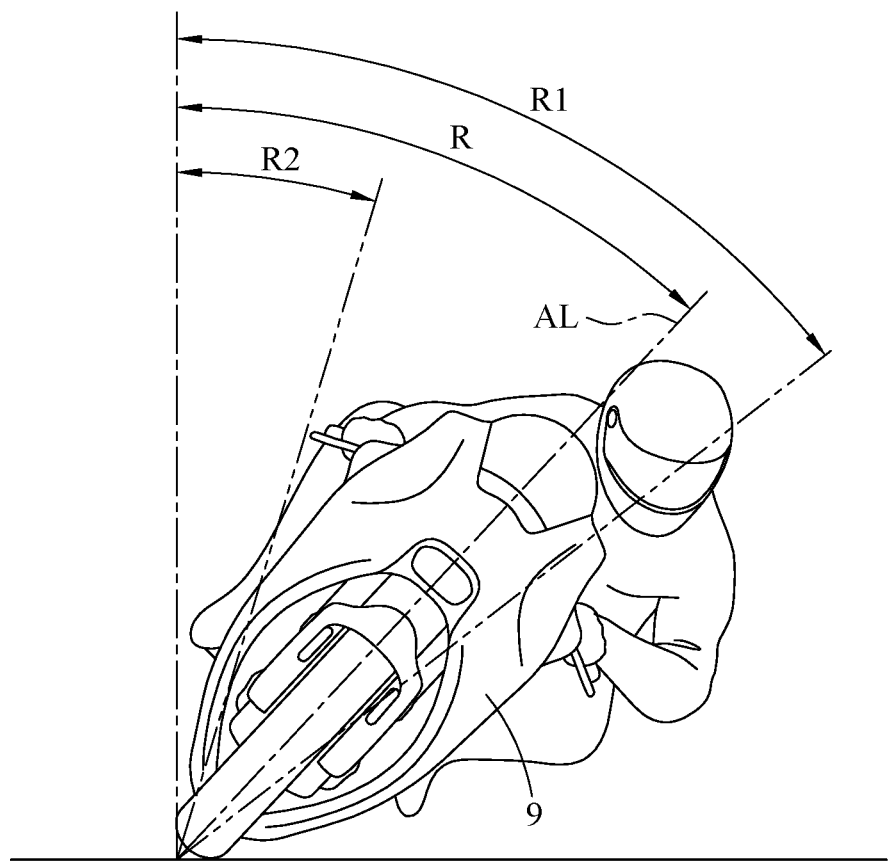
FIG. 5 is a front view of a rider riding the two-wheeler.

In other words, the gear-shift determining process S2 at least includes multiple steps, as shown in FIGS. 4-5. In step S201, the gear-shift determining module C4 sends out the gear shift request. In step S202, the gear-shift determining module C4 receives the current center-of-gravity datum. In step S203, the gear-shift determining module C4 calculates the roll angle variation R according to the current center-of-gravity datum. In step S204, the gear-shift determining module C4 determines whether the roll angle variation R is larger than or equal to the upper limit R1.

When the roll angle variation R is determined to be larger than or equal to the upper limit R1, step S205 is performed such that the gear-shift determining module C4 outputs the shift inhibition signal. At this moment, the gear-shift actuating module C5 indicates the transmission assembly M to not to perform the gear-shifting operation and indicates the transmission assembly M to shift to neutral gear. Generally, when the roll angle variation R is larger than or equal to the upper limit R1, the two-wheeler 9 may already fall to the ground. Shifting the transmission assembly M to neutral gear is able to avoid a sudden unintended acceleration of the two-wheeler 9 while lying on the ground or being held up.

On the other hand, when the roll angle variation R is determined to be smaller than the upper limit R1, step S206 is performed such that the gear-shift determining module C4 determines whether the roll angle variation R is larger than or equal to the lower limit R2.

When the roll angle variation R is determined to be larger than or equal to the lower limit R2, step S207 is performed such that the gear-shift determining module C4 outputs the gear holding signal. At this moment, the gear-shift actuating module C5 indicates the transmission assembly M to not to perform the gear-shifting operation and to remain at current gear. For example, when the two-wheeler 9 is taking a sharp turn at a high speed, the roll angle variation R is relatively large, and the two-wheeler 9 is likely to slip or roll over due to an unexpected gear shifting. Therefore, indicating the transmission assembly M to not to shift gear when the roll angle variation R is between the upper limit R1 and the lower limit R2 is able to prevent an unexpected gear shifting while the two-wheeler 9 is experiencing a large roll angle variation R, thereby preventing the two-wheeler 9 from slipping when taking a sharp turn.

On the other hand, when the roll angle variation R is determined to be smaller than the lower limit R2, step S208 is performed such that the gear-shift determining module C4 outputs the shifting signal. At this moment, the gear-shift actuating module C5 indicates the transmission assembly M to perform the gear-shifting operation. Generally, when the two-wheeler 9 is riding on a relatively mild curve or the two-wheeler 9 is taking turns at a low speed, the roll angle variation R is relatively small, and the two-wheeler 9 is unlikely to slip. Therefore, when the roll angle variation R is smaller than the lower limit R2, the transmission assembly M is allowed to directly perform the gear-shifting operation.

In this embodiment, the values of the upper limit R1 and the lower limit R2 are not restricted, and they are adjustable dependent on the actual requirements or setting of the two-wheeler 9. The transmission controller C is able to adjust the upper limit R1 and the lower limit R2 according to, for example, the speed of the two-wheeler 9. For instance, when the speed of the two-wheeler 9 reaches 100 kph, the upper limit R1 may be set to 60 degrees, and the lower limit R2 may be set to 10 degrees; when the speed of the two-wheeler 9 reaches 200 kph, the upper limit R1 may be set to 30 degrees, and the lower limit R2 may be set to 5 degrees.

Also, the transmission controller C is able to adjust the upper limit R1 and the lower limit R2 according to a friction force between the tire of the two-wheeler 9 and the ground. In detail, the data collecting module C2 may further include a tire pressure sensor (not shown in figures) and an oil pressure sensor (not shown in figures). The tire pressure sensor is configured to detect a tire pressure of the two-wheeler 9 to generate a tire pressure datum, and the oil pressure sensor is configured to detect an oil pressure of the anti-lock braking system (ABS) of the two-wheeler 9 to generate an oil pressure datum. The transmission controller C can calculate a normal force exerted by the tire to the ground according to the tire pressure datum, estimate a braking force according to the oil pressure datum, and calculate the friction force between the tire and the ground according to the normal force and braking force, and the friction force is the basis for adjusting the upper limit R1 and the lower limit R2.

In the previous embodiment, the gear-shift determining module C4 determines whether to perform the gear-shift determining process S2 according to the speed datum, the throttle opening datum and the current gear position datum generated from the data collecting module C2, but the present disclosure is not limited thereto. In other embodiments, the data collecting module C2 may be configured to further generate other mechanical data, such as an angle of a fork shaft, the oil pressure and a spring pressure of the clutch, and the gear-shift determining module C4 may determine whether to perform the gear-shift determining process S2 according to these mechanical data.

In the previous embodiment, the mobile device P and the transmission controller C are in communication with each other via a wireless manner, but the present disclosure is not limited thereto. In other embodiments, the transmission control system may further include a transmission cable connected to the mobile device and the transmission controller for transmitting the current center-of-gravity datum. The transmission cable has less signal interference and thus helps to maintain signal quality.

In the previous embodiment, the mobile device P is a smartphone, but the present disclosure is not limited thereto. In other embodiments, the mobile device may be a tablet computer or a smart watch that contains an orientation sensor.

Figure 6:
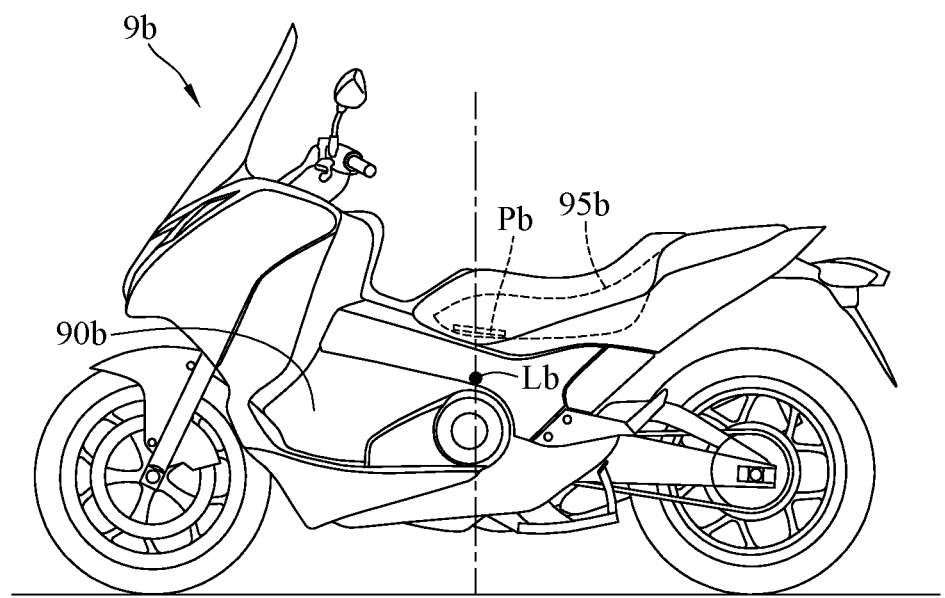
FIG. 6 is a side view of another two-wheeler installed with a mobile device of a transmission control system in accordance with another embodiment of the disclosure.

In the previous embodiment, the two-wheeler 9 is a sport bike, but the present disclosure is not limited to the type of the two-wheeler 9. For example, please refer to FIG. 6, which is a side view of another two-wheeler installed with a mobile device of a transmission control system in accordance with another embodiment of the disclosure. In this embodiment, a two-wheeler 9b is a touring bike, which has a center-of-gravity Lb lower than that of the previous embodiment. As shown in the figure, a mobile device Pb is preferably detachably disposed in a storage compartment 95b of a vehicle body 90b which is adjacent to the center-of-gravity Lb.

According to the transmission control system as described above, the current center-of-gravity of the vehicle body can be detected by the orientation sensor installed in the mobile device, and the transmission controller can calculate the roll angle variation according to the current center-of-gravity datum generated by the orientation sensor, indicate the transmission assembly whether to perform the gear-shifting operation according to the roll angle variation, and indicate the two-wheeler whether to shift to neutral gear. Therefore, while the two-wheeler is taking a sharp turn with a large roll angle variation, an unexpected gear shifting can be prevented, thereby preventing the two-wheeler from slipping; furthermore, if the two-wheeler accidentally falls to the ground, the transmission controller would indicate the two-wheeler to shift to neutral gear so as to prevent a sudden unintended acceleration.

In addition, the orientation sensor is installed in the mobile device, and thus the two-wheeler has no need to be additionally equipped with one, thereby saving the cost of installing an orientation sensor on the vehicle body.

Moreover, in some embodiments, the current center-of-gravity datum can be transmitted in a wireless manner. Therefore, there is no troublesome installing and tangling of wire. As a result, attaching the mobile device on the vehicle body and detaching it from the vehicle body are both convenient for the rider.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A transmission control system, adapted to be installed in a vehicle body of a two-wheeler, the transmission control system comprising:
   a transmission assembly, configured to be disposed on the vehicle body and to perform a gear-shifting operation;
   a mobile device, configured to be detachably disposed on the vehicle body, the mobile device comprising an orientation sensor capable of detecting a current center-of-gravity of the vehicle body to generate a current center-of-gravity datum; and
   a transmission controller, configured to be disposed on the vehicle body, to receive the current center-of-gravity datum, to calculate a roll angle variation according to the current center-of-gravity datum, and to output a gear-shift control command according to the roll angle variation;
   wherein the transmission controller is configured to indicate the transmission assembly whether to perform the gear-shifting operation according to the gear-shift control command.

2. The transmission control system according to claim 1, wherein the transmission controller comprises a data collecting module, a data transceiver module, a gear-shift determining module and a gear-shift actuating module, the data collecting module is configured to generate mechanical data according to the two-wheeler and the transmission assembly, the data transceiver module is configured to receive the current center-of-gravity datum and the mechanical data and to transmit the current center-of-gravity datum and the mechanical data to the gear-shift determining module, the gear-shift determining module is configured to determine whether to perform a gear-shift determining process according to the mechanical data, the gear-shift actuating module is configured to indicate the transmission assembly whether to perform the gear-shifting operation according to the gear-shift control command;
   wherein the gear-shift determining module is, when performing the gear-shift determining process, configured to:
   calculate the roll angle variation according to the current center-of-gravity datum; and
   output the gear-shift control command according to the roll angle variation.

3. The transmission control system according to claim 2, wherein the data collecting module comprises a rear wheel speed sensor, a throttle position sensor and a gear position sensor, the rear wheel speed sensor is configured to detect a speed of the two-wheeler to generate a speed datum, the throttle position sensor is configured to detect a throttle opening of an engine of the two-wheeler to generate a throttle opening datum, and the gear position sensor is configured to detect a current gear position of the transmission assembly to generate a current gear position datum; when the gear-shift determining module determines that the speed datum reaches a speed threshold and the throttle opening datum reaches a throttle opening threshold in accordance with the current gear position datum, the gear-shift determining module performs the gear-shift determining process.

4. The transmission control system according to claim 2, wherein the gear-shift control command comprises a shift inhibition signal, a gear holding signal and a shifting signal; when the gear-shift determining process outputs the shift inhibition signal, the gear-shift actuating module indicates the transmission assembly to not to perform the gear-shifting operation and indicates the transmission assembly to shift to neutral gear; when the gear-shift determining process outputs the gear holding signal, the gear-shift actuating module indicates the transmission assembly to not to perform the gear-shifting operation; when the gear-shift determining process outputs the shifting signal, the gear-shift actuating module indicates the transmission assembly to perform the gear-shifting operation.

5. The transmission control system according to claim 4, wherein the gear-shift determining module is, when performing the gear-shift determining process, configured to:
   send a gear shift request;
   receive the current center-of-gravity datum;
   calculate the roll angle variation according to the current center-of-gravity datum;
   determine whether the roll angle variation is larger than or equal to an upper limit;
   output the shift inhibition signal when the roll angle variation is larger than or equal to the upper limit;
   determine whether the roll angle variation is larger than or equal to a lower limit when the roll angle variation is smaller than the upper limit;
   output the gear holding signal when the roll angle variation is smaller than the upper limit and larger than or equal to the lower limit; and
   output the shifting signal when the roll angle variation is smaller than the lower limit.

6. The transmission control system according to claim 5, wherein the data collecting module comprises a rear wheel speed sensor, a tire pressure sensor and an oil pressure sensor, the rear wheel speed sensor is configured to detect a speed of the two-wheeler to generate a speed datum, the tire pressure sensor is configured to detect a tire pressure of the two-wheeler to generate a tire pressure datum, the oil pressure sensor is configured to detect an oil pressure of an anti-lock braking system of the two-wheeler to generate an oil pressure datum, and the transmission controller is configured to adjust the upper limit and the lower limit according to the speed datum, the tire pressure datum and the oil pressure datum.

7. The transmission control system according to claim 1, wherein the transmission assembly comprises a clutch, a gear shift drum, a clutch actuator and a shift control motor, the clutch actuator is configured to control the clutch, the shift control motor is configured to control the gear shift drum; the transmission assembly is, when performing the gear-shifting operation, configured to:
  drive the clutch actuator to control the clutch and drive the shift control motor to control the gear shift drum.

8. The transmission control system according to claim 1, wherein the mobile device further comprises a first wireless transceiver module, the transmission controller comprises a second wireless transceiver module, and the first wireless transceiver module is configured to transmit the current center-of-gravity datum to the second wireless transceiver module via a wireless manner.

9. The transmission control system according to claim 1, further comprising a transmission cable, wherein the transmission cable is configured to be connected to the mobile device and the transmission controller, and the transmission controller is configured to receive the current center-of-gravity datum via the transmission cable.

10. The transmission control system according to claim 1, wherein the mobile device is a smartphone.

11. The transmission control system according to claim 1, wherein the mobile device is configured to be detachably disposed on a center-of-gravity of the vehicle body, and the center-of-gravity is located at a junction of a gas tank and a saddle of the vehicle body.

12. The transmission control system according to claim 1, wherein the mobile device is configured to be detachably disposed in an extension direction of an axis which passes through a center-of-gravity of the vehicle body and is perpendicular to ground.

13. The transmission control system according to claim 12, wherein the mobile device is configured to be detachably disposed on a gas tank of the vehicle body or disposed in a storage compartment of the vehicle body.

* * * * *